United States Patent
Kim et al.

(10) Patent No.: US 10,259,978 B2
(45) Date of Patent: Apr. 16, 2019

(54) ADHESIVE FILM, OPTICAL MEMBER INCLUDING THE SAME, AND OPTICAL DISPLAY INCLUDING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Ji Ho Kim, Suwon-si (KR); Byeong Do Kwak, Suwon-si (KR); Il Jin Kim, Suwon-si (KR); Kenji Hamada, Uiwang-Si (KR); Yong Tae Kim, Suwon-si (KR); Hyung Rang Moon, Suwon-si (KR); Woo Jin Lee, Suwon-si (KR); Ik Hwan Cho, Suwon-si (KR); In Chul Hwang, Suwon-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 15/211,624

(22) Filed: Jul. 15, 2016

(65) Prior Publication Data
US 2017/0015880 A1    Jan. 19, 2017

(30) Foreign Application Priority Data

Jul. 16, 2015    (KR) .......................... 10-2015-0101242

(51) Int. Cl.
| | | |
|---|---|---|
| *C09J 7/30* | (2018.01) | |
| *C09J 133/08* | (2006.01) | |
| *C08F 220/18* | (2006.01) | |
| *C08F 265/06* | (2006.01) | |
| *C08F 285/00* | (2006.01) | |
| *C09J 4/06* | (2006.01) | |
| *C09J 133/06* | (2006.01) | |
| *C09J 151/00* | (2006.01) | |
| *C09J 7/22* | (2018.01) | |

(52) U.S. Cl.
CPC ........... *C09J 133/08* (2013.01); *C08F 220/18* (2013.01); *C08F 265/06* (2013.01); *C08F 285/00* (2013.01); *C09J 4/06* (2013.01); *C09J 7/22* (2018.01); *C09J 7/30* (2018.01); *C09J 133/066* (2013.01); *C09J 151/003* (2013.01); *C09J 2201/622* (2013.01); *C09J 2203/318* (2013.01); *C09J 2433/00* (2013.01)

(58) Field of Classification Search
CPC .... C09J 133/08; C09J 7/22; C09J 7/30; C08F 220/18
See application file for complete search history.

(56) References Cited

U.S. PATENT DOCUMENTS

| | | | | |
|---|---|---|---|---|
| 8,945,705 B2* | 2/2015 | Cho | ....................... | C09J 133/08 428/220 |
| 9,458,360 B2* | 10/2016 | Kim | ....................... | C09J 133/06 |
| 2005/0154140 A1 | 7/2005 | Hong et al. | | |
| 2007/0149715 A1 | 6/2007 | Lee et al. | | |
| 2011/0117362 A1 | 5/2011 | Yoshida et al. | | |
| 2014/0099495 A1* | 4/2014 | Kim | ....................... | C09J 133/08 428/220 |
| 2014/0315019 A1* | 10/2014 | Cho | ....................... | C09J 133/04 428/354 |
| 2016/0122600 A1* | 5/2016 | Moon | ................... | C09J 133/14 428/354 |
| 2016/0177146 A1* | 6/2016 | Mun | ......................... | C09J 7/22 428/220 |
| 2016/0177147 A1* | 6/2016 | Han | ....................... | C09J 133/08 428/220 |
| 2016/0289517 A1* | 10/2016 | Shin | ....................... | B32B 27/08 |
| 2017/0002237 A1* | 1/2017 | Cho | ....................... | C09J 133/08 |
| 2017/0121564 A1* | 5/2017 | Cho | ............................ | C09J 7/00 |
| 2017/0166786 A1* | 6/2017 | Moon | ................... | C09J 133/066 |
| 2017/0306193 A1* | 10/2017 | Moon | ................... | C09J 133/08 |
| 2017/0306194 A1* | 10/2017 | Kwak | ........................ | B32B 7/12 |
| 2017/0349791 A1* | 12/2017 | Lee | ............................ | C09J 7/00 |

FOREIGN PATENT DOCUMENTS

| | | |
|---|---|---|
| CN | 1764679 A | 4/2006 |
| CN | 103865411 A | 6/2014 |
| CN | 106010318 A | 10/2016 |
| JP | 2011-105829 A | 6/2011 |
| KR | 10-2005-0056158 A | 6/2005 |
| KR | 10-2007-0055363 A | 5/2007 |
| KR | 10-2010-0002638 A | 1/2010 |
| KR | 10-2010-0075726 A | 7/2010 |
| KR | 10-2014-0085299 A | 7/2014 |
| TW | 201420715 A | 6/2014 |

OTHER PUBLICATIONS

KIPO Office Action for corresponding Korean Patent Application No. 10-2015-0101242, dated May 22, 2017 (7 sheets).
TIPO Office Action for corresponding Taiwanese Patent Application No. 105122312, dated Apr. 13, 2017 (6 sheets).
Chinese Office Action dated Nov. 28, 2018 for corresponding Chinese Application No. 201610560996.0 (13 pgs.).

* cited by examiner

*Primary Examiner* — Hannah J Pak
(74) *Attorney, Agent, or Firm* — Lewis Roca Rothgerber Christie LLP

(57) ABSTRACT

An adhesive film, an optical member including the same, and an optical display including the same are disclosed. The adhesive film has a folding evaluation parameter 1 of about 900% to about 1,300% at 25° C., as calculated by Equation 1 and a folding evaluation parameter 2 of about 40% to about 95% at 60° C., as calculated by Equation 2, and includes a hydroxyl group-containing (meth)acrylic copolymer.

15 Claims, 6 Drawing Sheets

US 10,259,978 B2

ADHESIVE FILM, OPTICAL MEMBER INCLUDING THE SAME, AND OPTICAL DISPLAY INCLUDING THE SAME

CROSS-REFERENCE TO RELATED APPLICATION

This application claims priority to and the benefit of Korean Patent Application No. 10-2015-0101242, filed on Jul. 16, 2015 in the Korean Intellectual Property Office, the entire content of which is incorporated herein by reference.

BACKGROUND

1. Field

Embodiments of the present disclosure relate to an adhesive film, an optical member including the same, and an optical display including the same.

2. Description of the Related Art

An optical display includes display members including a window film, a conductive film, an organic light emitting diode, and the like. A touch pad has a stack structure in which a transparent adhesive film, for example, an optically clear adhesive (OCA) film, is interposed between the window film and the conductive film. The touch pad is operated in response to electrical signals generated by variation in capacitance occurring when a human body or a certain material touches or nearly touches (e.g., contacts or nearly contacts) the window film. The transparent adhesive film may also be stacked between two selected from the window film, the conductive film, a polarizing plate, and the organic light emitting diode.

Recently, a flexible display capable of being folded and unfolded has been developed. Since the flexible display can be folded and unfolded, the flexible display can be produced in various shapes and has a slim, lightweight structure and high impact resistance.

Various optical members included in the flexible display should have flexibility. Since the transparent adhesive film is interposed between the window film and the conductive film, the transparent adhesive film should have good adhesive strength at both surfaces thereof. In addition, the transparent adhesive film should have good foldability in order to be used in the flexible display.

SUMMARY

In accordance with one aspect of an embodiment of the present disclosure, an adhesive film includes a hydroxyl group-containing (meth)acrylic copolymer and has a folding evaluation parameter 1 of about 900% to about 1,300% at 25° C., as calculated by the following Equation 1 and a folding evaluation parameter 2 of about 40% to about 95% at 60° C., as calculated by the following Equation 2.

Folding evaluation parameter $1 = (X_1)/(X_0) \times 100$   Equation 1

Folding evaluation parameter $2 = (1-(X_2)/(X_3)) \times 100$   Equation 2

In Equations 1 and 2, $X_0$, $X_1$, $X_2$ and $X_3$ are as defined in the following detailed description.

In accordance with another aspect of an embodiment of the present disclosure, an optical member includes an optical film and the adhesive film on at least one surface of the optical film.

In accordance with another aspect of an embodiment of the present disclosure, an optical display includes the adhesive film.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1A:
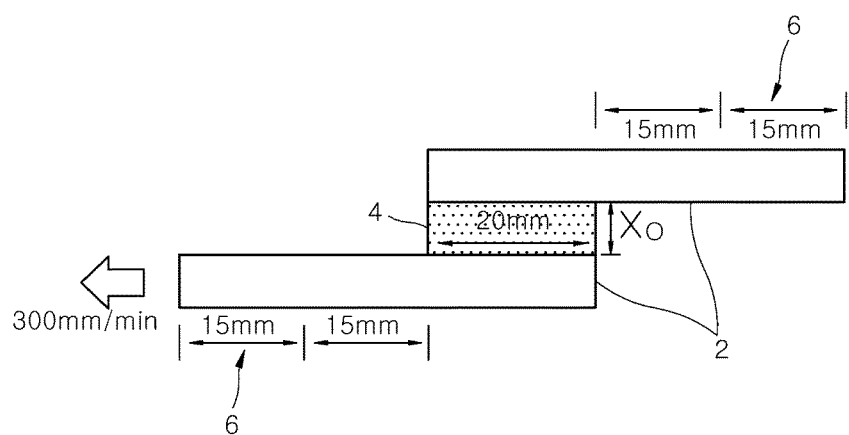
FIG. 1A is a cross-sectional view and FIG. 1B is a plan view of an embodiment of a specimen for measurement of folding evaluation parameters 1 and 2.

Embodiments of the present disclosure will be described in detail with reference to the accompanying drawings. It should be understood that the present disclosure may be embodied in different ways and is not limited to the following embodiments. In the drawings, portions not necessary to the description will be omitted for clarity. Like components will be denoted by like reference numerals throughout the present disclosure.

As used herein, spatially relative terms such as "upper" and "lower" are defined with reference to the accompanying drawings. Thus, it will be understood that "upper" can be used interchangeably with "lower". It will be understood that when a layer is referred to as being "on" another layer, it can be directly on or formed on the other layer, or intervening layer(s) may also be present. Thus, it will be understood that when a layer is referred to as being "directly on" another layer, no intervening layer is interposed therebetween As used herein, the term "(meth)acryl" refers to acryl or methacryl.

As used herein, the term "copolymer" may refer to oligomers, polymers, and resins.

Figure 1B:
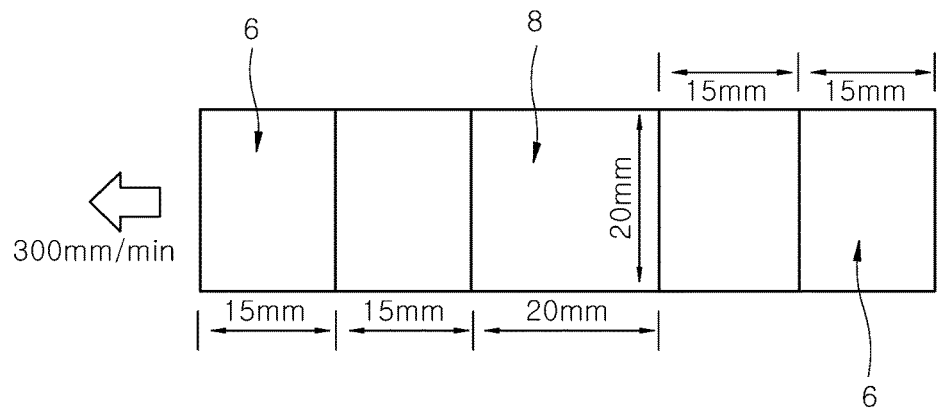
Figure 2:
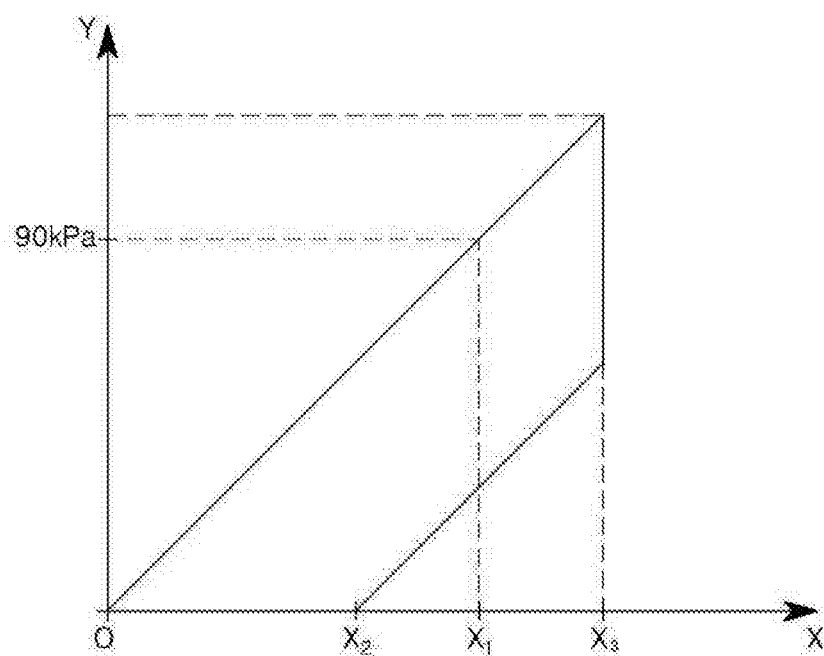
FIG. 2 is a graph for calculation of folding evaluation parameters 1 and 2.

As used herein, the terms "folding evaluation parameter 1" and the "folding evaluation parameter 2" refer to parameters that can be obtained by the following respective procedures. Referring to FIGS. 1A-1B, defining two ends of a polyethylene terephthalate (PET) film 2 (thickness: 75 μm) having a size of 50 mm×20 mm as a first end and a second end, respectively, two of the PET films 2 are attached to each other via an adhesive film 4 having a size of 20 mm×20 mm such that two respective ends of the PET films are attached to each other by the adhesive film (adhesive film attached portion 8). For example, the first end of one PET film, the adhesive film, and the second end of the other PET film may be stacked in the stated order, thereby providing a specimen having a contact area of 20 mm×20 mm between the adhesive film and each of the PET films. Referring to FIG. 1A and FIG. 2, jigs are fastened to two respective ends of the PET films 2 of the specimen (jig secured portions 6), which are not attached to the adhesive film of the specimen, and, with one of the jigs secured, the other jig is pulled at a speed of 300 mm/min until the adhesive film has a length (unit: μm, $X_3$) of 1,000% of an initial thickness (unit: μm, $X_0$) thereof, that is, 10 times the initial thickness of the adhesive film, and is maintained (e.g., maintained at the length $X_3$ that is 1,000% of the initial thickness $X_0$ of the adhesive film) for 10 seconds, followed by releasing the pulling force applied to the adhesive film. A graph in which the stretched length of the adhesive film is indicated on the X-axis and the force applied to the adhesive film is indicated on the Y-axis is obtained. Referring to FIG. 2, assuming that the stretched length of the adhesive film upon application of a force of 90 kPa to the adhesive film is defined as $X_1$ (unit: μm; e.g., $X_1$ is the stretched length of the adhesive film in μm under application of the force of 90 kPa during the adhesive film has been stretched to the length $X_3$ of 1,000% of the initial thickness $X_0$), the folding evaluation parameter 1 is a value calculated by the following Equation 1. After the adhesive film is stretched to a length ($X_3$) of 1,000% of the initial thickness thereof, the adhesive film is restored (e.g., restored to an unloaded or unstretched state) at the same or substantially the same speed (e.g., 300 mm/min) as the pulling speed. Here, assuming that the stretched length of the adhesive film upon application of a force of 0 kPa is defined as $X_2$ (unit: μm; e.g., $X_2$ is a length in μm of the adhesive film upon application of a force of 0 kPa after having been stretched to the length of 1,000% of the initial thickness, maintained at that stretched length for 10 seconds, and released), the folding evaluation parameter 2 is a value calculated by the following Equation 2.

$$\text{Folding evaluation parameter } 1=(X_1)/(X_0)\times 100 \quad \text{Equation 1}$$

$$\text{Folding evaluation parameter } 2=(1-(X_2)/(X_3))\times 100 \quad \text{Equation 2}$$

Here, the adhesive film may have an initial thickness of 20 μm to 300 μm. The folding evaluation parameter 1 and the folding evaluation parameter 2 can be measured by a TA.XT_Plus Texture Analyzer (available from Stable Micro Systems Ltd.). The folding evaluation parameters 1 and 2 may be measured at a temperature of 25° C. to 80° C.

As used herein, the term "folding conditions" refers to a condition that a specimen having a stack structure of PET film (thickness: 50 μm to 125 μm)/adhesive film (thickness: 20 μm to 150 μm)/PET film (thickness: 50 μm to 125 μm) is prepared, and then folded and unfolded 100,000 times with a rod having a radius of 3 mm placed at the center of the specimen.

As used herein, the term "good foldability" refers to a case where a specimen does not suffer from generation of striped patterns at a folded portion of an adhesive film, fracture, slight lifting or peeling of the adhesive film, or cracks in the PET film under the folding conditions referred to herein.

As used herein, the term "average particle diameter" of organic nanoparticles refers to a particle diameter thereof, as measured in a water-based or organic solvent using a Zetasizer nano-ZS (available from Malvern Co., Ltd.) and represented by a Z-average value.

Herein, the glass transition temperature can be measured utilizing a homopolymer of each measurement target monomer (e.g., the monomer for which the glass transition temperature is to be determined) using a DSC Q20 (available from TA Instrument Inc.). For example, a homopolymer of each monomer is heated to about 100° C. at a rate of about 10° C./min, maintained at about 100° C. for about 5 minutes, slowly cooled to about −180° C. at a rate of about 10° C./min, and maintained at about −180° C. for about 10 minutes. Then, the homopolymer of each monomer is heated from about −180° C. to about 160° C. at a rate of about 10° C./min in order to obtain data for an endothermic transition curve. An inflection point of the endothermic transition curve is determined to be the glass transition temperature.

Hereinafter, an adhesive film according to an embodiment of the present disclosure will be described.

The adhesive film according to an embodiment of the present disclosure has a folding evaluation parameter 1 of about 900% to about 1,300% at 25° C. and a folding evaluation parameter 2 of about 40% to about 95% at 60° C. Within this range, the adhesive film can exhibit good foldability under the folding conditions described herein. Thus, the adhesive film does not suffer from slight lifting or peeling with respect to an adherend and can be restored to an original state (or an initial state) without generation of striped patterns at a folded portion thereof even after folding. For example, the adhesive film may have a folding evaluation parameter 1 of about 950% to about 1,250% at 25° C. and a folding evaluation parameter 2 of about 70% to about 95% at 60° C.

The folding evaluation parameter 1 of Equation 1 can provide an evaluation result as to whether the adhesive film can be folded well under folding conditions. When the adhesive film has a folding evaluation parameter 1 of about 900% to about 1,300% at 25° C., the adhesive film can be folded well and exhibit good foldability without fracture (or substantially without fracture), slight lifting, peeling, and the like, and thus can be used in a flexible display. The folding evaluation parameter 2 of Equation 2 can provide an evaluation result as to whether the adhesive film can be restored to an original state (or an initial state) without generation of striped patterns at a folded portion thereof even after folding. When the adhesive film has a folding evaluation parameter 2 of about 40% to about 95% at 60° C., the adhesive film can be restored to an original state (or an initial state) without generation of striped patterns at a folded portion thereof even after folding, exhibit good foldability, and thus can be used in a flexible display.

For example, the folding evaluation parameters 1 and 2 can be used in evaluation as to whether the adhesive film exhibits good foldability under folding conditions of a wide temperature range of, for example, about −20° C. to about 80° C. in a stack structure wherein the adhesive film is stacked between a window film (for example: a transparent polyimide film) and a polarizing plate or stacked on an OLED panel.

The adhesive film, which may have a thickness of, for example, 50 μm, may have a peel strength at 25° C. of about 400 gf/in to about 4,000 gf/in, for example, about 500 gf/in to about 3,500 gf/in, or about 600 gf/in to about 3,000 gf/in, with respect to a PET film subjected to corona pretreatment. Within this range, the adhesive film can exhibit good adhesion and reliability at room temperature. Further, the adhesive film having a thickness of 50 μm may have a peel strength at 60° C. of about 200 gf/in to about 2,000 gf/in, for example, about 300 gf/in to about 2,000 gf/in, or about 400 gf/in to about 1,500 gf/in, with respect to a PET film subjected to corona pretreatment. Within this range, the adhesive film can exhibit good adhesion and reliability at high temperature for example at 60° C.

The adhesive film may have a haze of about 1% or less, for example, about 0.1% to about 0.9%, and a total light transmittance of about 90% or more, for example, about 95% to about 99%, in the visible region (for example: at a wavelength of 380 nm to 780 nm). Within this range, the adhesive film has good transparency and can be used in an optical display.

The adhesive film may have a thickness of about 20 μm to about 300 μm, for example, about 30 μm to about 150 μm. Within this thickness range, the adhesive film can be used in an optical display.

The adhesive film may be formed of an adhesive composition that includes a hydroxyl group (—OH)-containing (meth)acrylic copolymer and an initiator. In some embodiments, the adhesive film may be formed of an adhesive composition that includes a hydroxyl group-containing (meth)acrylic copolymer, organic nanoparticles, and an initiator.

Now, each of the components of the adhesive composition will be described in more detail.

The hydroxyl group-containing (meth)acrylic copolymer forms a matrix of the adhesive film and can exhibit adhesion.

The hydroxyl group-containing (meth)acrylic copolymer may have a glass transition temperature (Tg) of about −150° C. to about −13° C., for example, about −100° C. to about −20° C. Within this range, the adhesive film can exhibit good foldability under the folding conditions described herein, and has good adhesion and reliability in a wide temperature range.

The hydroxyl group-containing (meth)acrylic copolymer may have a refractive index of about 1.40 to about 1.70, for example, about 1.48 to about 1.60. Within this range, the adhesive film can maintain (or substantially maintain) transparency when stacked on different optical films.

In an embodiment, the hydroxyl group-containing (meth)acrylic copolymer may be a copolymer of (e.g., a polymerization product of) a monomer mixture including a hydroxyl group-containing (meth)acrylate (a1) and a reactive or non-reactive (meth)acrylate (a2). As used herein, the term "reactive" in "reactive or non-reactive" means that the (meth)acrylate exhibits reactivity with the (meth)acrylic copolymer, an initiator, a crosslinking agent, and/or the like.

The hydroxyl group-containing (meth)acrylate (a1) may be a (meth)acrylate containing at least one hydroxyl group. For example, the hydroxyl group-containing (meth)acrylate (a1) may include at least one selected from among 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl (meth)acrylate, 4-hydroxycyclopentyl (meth)acrylate, 4-hydroxycyclohexyl (meth)acrylate, and cyclohexanedimethanol mono(meth)acrylate. These compounds can improve productivity of the adhesive film while further improving adhesion of the adhesive film.

In the monomer mixture, the hydroxyl group-containing (meth)acrylate (a1) may be present in an amount of about 4% by weight (wt %) to about 45 wt %, for example, about 4 wt % to about 40 wt %, about 5 wt % to about 45 wt %, or about 10 wt % to about 35 wt %, for example about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, or 35 wt %, based on the total weight of the monomer mixture. Within this range, the adhesive film can have further improved adhesion and durability.

The reactive or non-reactive (meth)acrylate (a2) may include a non-hydroxyl group-containing (meth)acrylate that does not contain a hydroxyl group. For example, the reactive or non-reactive (meth)acrylate (a2) may include at least one selected from an alkyl (meth)acrylate monomer (a21), an ethylene oxide-containing monomer (a22), a propylene oxide-containing monomer (a23), an amine group-containing monomer (a24), an amide group-containing monomer (a25), an alkoxy group-containing monomer (a26), a phosphate group-containing monomer (a27), a sulfonate group-containing monomer (a28), a phenyl group-containing monomer (a29), and a silane group-containing monomer (a30).

The alkyl (meth)acrylate monomer (a21) may include an unsubstituted $C_1$ to $C_{20}$ linear or branched alkyl (meth)acrylic ester. For example, the alkyl (meth)acrylate (a21) may include at least one selected from among methyl (meth)acrylate, ethyl (meth)acrylate, propyl (meth)acrylate, n-butyl (meth)acrylate, t-butyl (meth)acrylate, isobutyl (meth)acrylate, pentyl (meth)acrylate, hexyl (meth)acrylate, heptyl (meth)acrylate, ethylhexyl (meth)acrylate, octyl (meth)acrylate, iso-octyl (meth)acrylate, nonyl (meth)acrylate, decyl (meth)acrylate, and lauryl (meth)acrylate. For example, a $C_4$ to $C_8$ alkyl (meth)acrylic monomer may be used in order to provide further improvement in initial adhesion. In some embodiments, a branched alkyl (meth)acrylic monomer may be used in order to provide further improvement in initial adhesion.

The ethylene oxide-containing monomer (a22) may include at least one type (or kind) of (meth)acrylate monomer containing an ethylene oxide group (—$CH_2CH_2O$—). For example, the ethylene oxide-containing monomer (a22) may include polyethylene oxide alkyl ether (meth)acrylates such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide mono-isopropyl ether (meth)acrylate, polyethylene oxide mono-isobutyl ether (meth)acrylate, and/or polyethylene oxide mono-tert-butyl ether (meth)acrylate, without the ethylene oxide-containing monomer (a22) being limited thereto.

The propylene oxide-containing monomer (a23) may include polypropylene oxide alkyl ether (meth)acrylates such as polypropylene oxide monomethyl ether (meth)acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth)acrylate, polypropylene oxide diethyl ether (meth)acrylate, polypropylene oxide mono-isopropyl ether (meth)acrylate, polypropylene oxide mono-isobutyl ether (meth)acrylate, and/or polypropylene oxide mono-tert-butyl ether (meth)acrylate, without the propylene oxide-containing monomer (a23) being limited thereto.

The amine group-containing monomer (a24) may include amino group-containing (meth)acrylic monomers such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, and/or methacryloxyethyltrimethyl ammonium chloride (meth)acrylate, without the amine group-containing monomer (a24) being limited thereto.

The amide group-containing monomer (a25) may include amide group-containing (meth)acrylic monomers such as (meth)acrylamide, N-methyl acrylamide, N-methyl methacrylamide, N-methylol (meth)acrylamide, N-methoxymethyl (meth)acrylamide, N,N-methylene bis(meth)acrylamide, and/or 2-hydroxyethyl acrylamide, without the amide group-containing monomer (a25) being limited thereto.

The alkoxy group-containing monomer (a26) may include 2-methoxy ethyl (meth)acrylate, 2-methoxypropyl (meth)acrylate, 2-ethoxypropyl (meth)acrylate, 2-butoxypropyl (meth)acrylate, 2-methoxypentyl (meth)acrylate, 2-ethoxypentyl (meth)acrylate, 2-butoxyhexyl (meth)acrylate, 3-methoxypentyl (meth)acrylate, 3-ethoxypentyl (meth)acrylate, and/or 3-butoxyhexyl (meth)acrylate, without the alkoxy group-containing monomer (a26) being limited thereto.

The phosphate group-containing monomer (a27) may include phosphate group-containing acrylic monomers such as 2-methacryloyloxyethyldiphenylphosphate (meth)acrylate, trimethacryloyloxyethylphosphate (meth)acrylate, and/or triacryloyloxyethylphosphate (meth)acrylate, without the phosphate group-containing monomer (a27) being limited thereto.

The sulfonate group-containing monomer (a28) may include sulfonate group-containing acrylic monomers such as sodium sulfopropyl (meth)acrylate, sodium 2-sulfoethyl (meth)acrylate, and/or sodium 2-acrylamido-2-methylpropane sulfonate, without the sulfonate group-containing monomer (a28) being limited thereto.

The phenyl group-containing monomer (a29) may include phenyl group-containing acrylic vinyl monomers such as p-tert-butylphenyl (meth)acrylate, o-biphenyl (meth)acrylate, and/or phenoxy ethyl (meth)acrylate, without the phenyl group-containing monomer (a29) being limited thereto.

The silane group-containing monomer (a30) may include silane group-containing vinyl monomers such as 2-acetoacetoxyethyl (meth)acrylate, vinyltrimethoxysilane, vinyltriethoxysilane, vinyl tris(β-methoxyethyl)silane, vinyltriacetylsilane, and/or methacryloyloxypropyltrimethoxysilane, without the silane group-containing monomer (a30) being limited thereto.

In an embodiment, the reactive or non-reactive (meth)acrylate monomer (a2) may be any one selected from among the aforementioned monomers, a homopolymer of which has a glass transition temperature (Tg) of about −150° C. to about 0° C. As a result, the glass transition temperature of the hydroxyl group-containing (meth)acrylic copolymer can be decreased, and the adhesive film can maintain (or substantially maintain) good adhesive strength at low temperature (−20° C.) and has similar storage modulus at high temperature (80° C.) and low temperature (−20° C.). The reactive or non-reactive (meth)acrylate (a2), a homopolymer of which has a glass transition temperature (Tg) of about −150° C. to about 0° C., forms the matrix of the adhesive film and can reduce the glass transition temperature of the hydroxyl group-containing (meth)acrylic copolymer, thereby providing an adhesive film satisfying the folding evaluation parameters 1 and 2.

The homopolymer of the reactive or non-reactive (meth)acrylate monomer (a2) may have a glass transition temperature (Tg) of, for example, about −150° C. to about −20° C., or about −150° C. to about −40° C. Within this range, the adhesive film can have further improved bending properties, foldability, adhesion, and reliability.

In the monomer mixture, the reactive or non-reactive (meth)acrylate monomer (a2) may be present in an amount of about 55 wt % to about 95 wt %, for example, about 65 wt % to about 90 wt %, or about 60 wt % to about 80 wt %, for example about 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, based on the total weight of the monomer mixture. Within this range, the adhesive film can exhibit further improved adhesion and durability.

The monomer mixture may further include a carboxylic acid group-containing monomer. The carboxylic acid group-containing monomer may include (meth)acrylic acid, 2-carboxyethyl (meth)acrylate, 3-carboxypropyl (meth)acrylate, 4-carboxybutyl (meth)acrylate, itaconic acid, crotonic acid, maleic acid, fumaric acid, and/or maleic anhydride, without the carboxylic acid group-containing monomer being limited thereto.

In the monomer mixture, the carboxylic acid group-containing monomer may be present in an amount of about 10 wt % or less, for example, about 7 wt % or less, for example, about 5 wt % or less, based on the total weight of the monomer mixture. Within this range, the adhesive film can exhibit further improved adhesion and durability.

In an embodiment, the hydroxyl group-containing (meth)acrylic copolymer may be a copolymer of (e.g., a polymerization product of) a monomer mixture including about 5 wt % to about 45 wt %, for example, about 10 wt % to about 35 wt % of the hydroxyl group-containing (meth)acrylate (a1), and about 55 wt % to about 95 wt %, for example, about 65 wt % to about 90 wt % of the reactive or non-reactive (meth)acrylate (a2), based on the total weight of the monomer mixture. Within this range, the adhesive film can exhibit good foldability at high temperature (60° C.).

In another embodiment, the hydroxyl group-containing (meth)acrylic copolymer may be a copolymer of (e.g., a polymerization product of) a monomer mixture including the hydroxyl group-containing (meth)acrylate (a1), the reactive or non-reactive (meth)acrylate (a2), and a macromonomer.

The macromonomer has a functional group capable of being cured by active energy rays and can be polymerized with the hydroxyl group-containing (meth)acrylate (a1) and/or the reactive or non-reactive (meth)acrylate (a2). The macromonomer may be reactive or non-reactive. For example, the macromonomer may be represented by Formula 1:

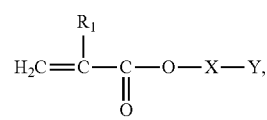

Formula 1 wherein, in Formula 1, $R_1$ is a hydrogen or a methyl group; X is a single bond or bivalent (divalent) linking group; and Y is a polymer chain obtained through polymerization of at least one selected from among methyl (meth)acrylate, ethyl (meth)acrylate, n-butyl (meth)acrylate, isobutyl (meth)acrylate, t-butyl (meth)acrylate, styrene, and (meth)acrylonitrile.

The bivalent linking group may be a $C_1$ to $C_{10}$ alkylene group, a $C_7$ to $C_{13}$ aryl alkylene group, a $C_6$ to $C_{12}$ arylene group, —$NR_2$— ($R_2$ being hydrogen or a $C_1$ to $C_5$ alkyl group), —COO—, —O—, —S—, —$SO_2NH$—, —$NHSO_2$—, —NHCOO—, —OCONH—, or a group derived from a heterocyclic ring.

The macromonomer may have a number average molecular weight of about 2,000 to about 20,000 g/mol, for example, about 2,000 to about 10,000 g/mol, or about 4,000 to about 8,000 g/mol. Within this range, the adhesive film can exhibit sufficient or suitable adhesive strength, good heat resistance, and can suppress deterioration in workability due to increase in viscosity of the adhesive composition.

The macromonomer may have a glass transition temperature of about 40° C. to about 150° C., for example, about 60° C. to about 140° C., or about 80° C. to about 130° C. Within this range, the adhesive film can exhibit sufficient or suitable cohesion and can suppress or reduce deterioration in viscosity or adhesive strength.

Also, in Formula 1, the bivalent linking group represented by X may be represented by one selected from Formulae 1a to 1d.

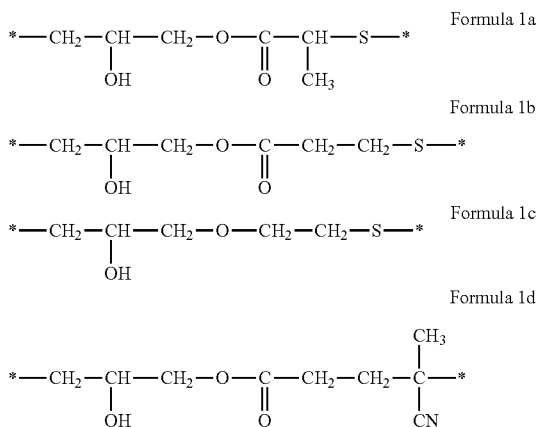

(wherein * is a linking site between elements.)

The macromonomer may be a commercially available product. For example, the macromonomer may be a macromonomer in which a segment corresponding to Y is methyl methacrylate, a macromonomer in which the segment corresponding to Y is styrene, a macromonomer in which the segment corresponding to Y is styrene/acrylonitrile, or a macromonomer in which the segment corresponding to Y is butyl acrylate, all of which include terminal methacryloyl groups.

In the adhesive film, the macromonomer may be present in an amount of about 0.1 wt % to about 20 wt %, for example, about 0.5 wt % to about 10 wt %, for example about 0.5 wt %, 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, based on the total weight of the adhesive film. Within this range, the adhesive film has balance between viscoelasticity, modulus and recovery rate.

In an embodiment, the hydroxyl group-containing (meth)acrylic copolymer may be a copolymer of (e.g., a polymerization product of) a monomer mixture including about 4 wt % to about 40 wt %, for example, about 10 wt % to about 35 wt % of the hydroxyl group-containing (meth)acrylate (a1), about 55 wt % to about 95 wt %, or about 60 wt % to about 80 wt % of the reactive or non-reactive (meth)acrylate (a2), and about 0.1 wt % to about 20 wt %, for example, about 0.5 wt % to about 10 wt % of the macromonomer, based on the total weight of the monomer mixture. Within this range, the adhesive film can exhibit good foldability at high temperature (60° C.).

The organic nanoparticles secure good foldability of the adhesive film at room temperature and high temperature, improve viscoelasticity of the adhesive film at low temperature and/or room temperature, and have a crosslinked structure so as to allow the adhesive film to exhibit stable high temperature viscoelasticity. In addition, the adhesive composition includes organic nanoparticles having a set (or particular) average particle diameter and a difference in refractive index between the organic nanoparticles and the hydroxyl group-containing (meth)acrylic copolymer is regulated to be small, whereby the adhesive film can exhibit good transparency despite the presence of the organic nanoparticles therein.

The organic nanoparticles may have an average particle diameter of about 10 nm to about 400 nm, for example, about 10 nm to about 300 nm, about 10 nm to about 200 nm, or about 50 nm to about 150 nm. Within this range, the organic nanoparticles can be prevented from being agglomerated (or such agglomeration may be reduced) and do not affect (or do not substantially affect) foldability of the adhesive film, and the adhesive film can exhibit good transparency.

A difference in refractive index between the organic nanoparticles and the hydroxyl group-containing (meth)acrylic copolymer may be about 0.05 or less, for example, about 0 to about 0.03, or about 0 to about 0.02. Within this range, the adhesive film can exhibit good transparency.

The organic nanoparticles may have a refractive index of about 1.40 to about 1.70, for example, about 1.48 to about 1.60. Within this range, the adhesive film can exhibit good transparency.

The organic nanoparticles may have a core-shell structure (e.g., the organic nanoparticles may include a core and a shell at least partially surrounding the core), in which the core and the shell satisfy the following Equation 3. With the organic nanoparticles having this structure, the adhesive film can exhibit good foldability and effective or suitable balance between elasticity and flexibility.

$$Tg(c) < Tg(s) \qquad \text{Equation 3}$$

wherein Tg (c) is a glass transition temperature (° C.) of the core and Tg (s) is a glass transition temperature (° C.) of the shell.

As used herein, the term "shell" means an outermost layer of the organic nanoparticle. The core may be a spherical particle (e.g., a substantially spherical particle). In some embodiments, the core may include an additional layer surrounding the spherical particles so long as the core has a glass transition temperature as follows.

For example, the core may have a glass transition temperature of about −150° C. to about 10° C., for example, about −150° C. to about −5° C., or about −150° C. to about −20° C. Within this range, the adhesive film has good viscoelasticity at low temperature and/or at room temperature. The core may include at least one selected from a poly(alkyl (meth)acrylate) and a polysiloxane each having a glass transition temperature within this range.

The poly(alkyl (meth)acrylate) includes at least one selected from poly(methyl acrylate), poly(ethyl acrylate), poly(propyl acrylate), poly(butyl acrylate), poly(isopropyl acrylate), poly(hexyl acrylate), poly(hexyl methacrylate), poly(ethylhexyl acrylate), and poly(ethylhexyl methacrylate), without the poly(alkyl (meth)acrylate) being limited thereto.

The polysiloxane may be, for example, an organosiloxane (co)polymer. The organosiloxane (co)polymer may be a non-crosslinked or crosslinked organosiloxane (co)polymer. The crosslinked organosiloxane (co)polymer may be used to secure impact resistance and colorability. For example, the crosslinked organosiloxane (co)polymer may include crosslinked dimethylsiloxane, methylphenylsiloxane, diphenylsiloxane, or mixtures thereof. With a copolymer of two or more organosiloxanes, the organic nanoparticles can have a refractive index of about 1.41 to about 1.50.

A crosslinked state of the organosiloxane (co)polymer may be determined based on a degree of dissolution in various suitable organic solvents. As the degree of crosslinking of the organosiloxane (co)polymer intensifies, the degree of dissolution of the organosiloxane (co)polymer is reduced. A solvent for determination of the crosslinked state may include acetone, toluene, and/or the like. For example, the organosiloxane (co)polymer may have a moiety which is not dissolved in acetone or toluene. The organosiloxane copolymer may include about 30% or more of insolubles in toluene.

The organosiloxane (co)polymer may further include an alkyl acrylate crosslinked polymer. The alkyl acrylate crosslinked polymer may include methyl acrylate, ethyl acrylate, n-butyl acrylate, 2-ethylhexyl acrylate, and/or the like. For example, the alkyl acrylate crosslinked polymer may be n-butyl acrylate or 2-ethylhexyl acrylate having a low glass transition temperature.

For example, the shell may have a glass transition temperature of about 15° C. to about 150° C., for example, about 35° C. to about 150° C., or about 50° C. to about 140° C. Within this range, the organic nanoparticles exhibit good dispersion in the (meth)acrylic copolymer. The shell may include polyalkyl methacrylate having a glass transition temperature within this range. For example, the shell may include at least one selected from poly(methyl methacrylate) (PMMA), poly(ethyl methacrylate), poly(propyl methacrylate), poly(butyl methacrylate), poly(isopropyl methacrylate), poly(isobutyl methacrylate) and poly(cyclohexyl methacrylate), without the shell being limited thereto.

In the organic nanoparticles, the core may be present in an amount of about 30 wt % to about 99 wt %, for example, about 40 wt % to about 95 wt %, or about 50 wt % to about 90 wt %, based on the total weight of the organic nanoparticles. Within this range, the adhesive film can exhibit good foldability in a wide temperature range.

In the organic nanoparticles, the shell may be present in an amount of about 1 wt % to about 70 wt %, for example, about 5 wt % to about 60 wt %, or about 10 wt % to about 50 wt %, based on the total weight of the organic nanoparticles. Within this range, the adhesive film can exhibit good foldability in a wide temperature range.

In the adhesive film, the organic nanoparticles may be present in an amount of about 20 wt % or less, for example, about 0.1 wt % to about 20 wt %, or about 0.5 wt % to about 10 wt %, for example about 0.5 wt %, 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, based on the total weight of the adhesive film. Within this range, the adhesive film can have balance between viscoelasticity, modulus and recovery rate.

The organic nanoparticles may be prepared by emulsion polymerization.

In a total of 100 parts by weight of the hydroxyl group-containing (meth)acrylic copolymer and the organic nanoparticles, the hydroxyl group-containing (meth)acrylic copolymer may be present in an amount of about 80 parts by weight to about 99.9 parts by weight, for example, about 90 parts by weight to about 99.5 parts by weight, and the organic nanoparticles may be present in an amount of about 0.1 parts by weight to about 20 parts by weight, for example, about 0.5 parts by weight to about 10 parts by weight. Within this range, the adhesive film can exhibit good foldability at high temperature (e.g., 60° C.).

The initiator can cure the hydroxyl group-containing (meth)acrylic copolymer. The initiator may include a radical photo initiator. The initiator may be an acetophenone compound, a benzyl ketal type (or kind of) compound, or a mixture thereof, without the initiator being limited thereto. In some embodiments, the acetophenone compound includes 2,2-dimethoxy-2-phenylacetophenone, 2,2'-diethoxy acetophenone, 2,2'-dibutoxy acetophenone, 2-hydroxy-2-methyl propiophenone, p-t-butyl trichloro-acetophenone, p-t-butyl dichloro-acetophenone, 4-chloro-acetophenone, 2,2'-dichloro-4-phenoxy acetophenone, 2-methyl-1-(4-(methylthio)phenyl)-2-morpholino-propan-1-one, 2-benzyl-2-dimethyl amino-1-(4-morpholino phenyl)-butane-1-one, and mixtures thereof.

The initiator may be present in an amount of about 0.01 parts by weight to about 5 parts by weight, for example, about 0.05 parts by weight to about 3 parts by weight, or about 0.1 parts by weight to about 1 part by weight, relative to 100 parts by weight of the hydroxyl group-containing (meth)acrylic copolymer. Within this range, the initiator allows complete (or substantially complete) curing of the adhesive composition, can prevent or reduce deterioration in transmittance (e.g., visible light transmittance) of the adhesive composition due to a residual initiator, can reduce bubble generation in the adhesive composition, and can exhibit good reactivity.

The adhesive composition may further include a crosslinking agent. The crosslinking agent can increase a crosslinking degree of the adhesive composition, thereby improving mechanical strength of the adhesive film.

The crosslinking agent may include a polyfunctional (meth)acrylate capable of being cured by active energy rays. Examples of the crosslinking agent may include: bifunctional acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate, and/or bis[4-(2-acryloyloxyethoxy)phenyl]fluorene; trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, and/or tris(meth)acryloxyethylisocyanurate; tetrafunctional acrylates such as diglycerin tetra(meth)acrylate and/or pentaerythritol tetra(meth)acrylate; pentafunctional acrylates such as dipentaerythritol penta(meth)acrylate; and/or hexafunctional acrylates such as dipentaerythritol hexa(meth)acrylate, caprolactone-modified dipentaerythritol hexa(meth)acrylate, and/or urethane (meth)acrylates (for example, reaction products of an isocyanate monomer and trimethylolpropane tri(meth)acrylate), without the crosslinking agent being limited thereto. These crosslinking agents may be used alone or in combination thereof. In some embodiments, the crosslinking agent is a polyfunctional (meth)acrylate of a polyhydric alcohol.

The crosslinking agent may be present in an amount of about 0.01 parts by weight to about 10 parts by weight, for example, about 0.03 parts by weight to about 7 parts by weight, or about 0.1 parts by weight to about 5 parts by weight, relative to 100 parts by weight of the hydroxyl group-containing (meth)acrylic copolymer. Within this range, the adhesive film can exhibit good adhesion and improved reliability.

The adhesive composition may further include a silane coupling agent. The silane coupling agent may be any suitable silane coupling agent available in the art. For example, the silane coupling agent may include at least one selected from the group consisting of epoxy structure-containing silicon compounds such as 3-glycidoxypropyltrimethoxysilane, 3-glycidoxypropyltriethoxysilane, 3-glycidoxypropylmethyldimethoxysilane, and 2-(3,4-epoxycyclohexyl)ethyltrimethoxysilane; polymerizable unsaturated group-containing silicon compounds such as vinyltrimethoxysilane, vinyltriethoxysilane, and (meth)acryloxypropyltrimethoxysilane; amino group-containing silicon compounds such as 3-aminopropyltrimethoxysilane, N-(2-aminoethyl)-3-aminopropyltrimethoxysilane, and N-(2-aminoethyl)-3-aminopropylmethyldimethoxysilane; and 3-chloropropyltrimethoxysilane, without the silane coupling agent being limited thereto. In some embodiments, a silane coupling agent having an epoxy structure is used.

The silane coupling agent may be present in an amount of about 0.01 parts by weight to about 0.1 parts by weight, for example, about 0.05 parts by weight to about 0.1 parts by weight, relative to 100 parts by weight of the hydroxyl group-containing (meth)acrylic copolymer. Within this range, the adhesive composition can improve reliability of the adhesive film.

Optionally, the adhesive composition may further include any suitable additives available in the art, such as curing accelerators, ionic liquids, lithium salts, inorganic fillers, softeners, molecular weight regulators, antioxidants, anti-aging agents, stabilizers, adhesion-imparting resins, reforming resins (polyol, phenol, acrylic, polyester, polyolefin, epoxy, epoxidized polybutadiene resins, and the like), leveling agents, defoamers, plasticizers, dyes, pigments (coloring pigments, extender pigments, and the like), processing agents, ultra-violet (UV) blocking agents, fluorescent whitening agents, dispersants, heat stabilizers, photostabilizers, UV absorbers, antistatic agents, coagulants, lubricants, solvents, and/or the like.

The adhesive composition may have a viscosity at 25° C. of about 300 cP to about 50,000 cP. Within this range the adhesive composition can have good coatability and thickness uniformity.

The adhesive composition may be prepared through partial polymerization of the monomer mixture for the hydroxyl group-containing (meth)acrylic copolymer, followed by introducing the initiator thereto. In preparation of the adhesive composition, the crosslinking agent, the silane coupling agent, and the additives described above may be further added. In some embodiments, the adhesive composition may be prepared through partial polymerization of a mixture including the monomer mixture for the hydroxyl group-containing (meth)acrylic copolymer and the organic nanoparticles, followed by introducing the initiator thereto. In preparation of the adhesive composition, the crosslinking agent, the silane coupling agent, and the additives described above may be further added. Partial polymerization may include solution polymerization, suspension polymerization, photopolymerization, bulk polymerization, or emulsion polymerization. For example, solution polymerization may be performed at about 50° C. to about 100° C. by adding the initiator to the monomer mixture. The initiator may be an acetophenone radical photopolymerization initiator including 2,2-dimethoxy-2-phenylacetophenone. Through partial polymerization, the adhesive composition may be polymerized to have a viscosity at 25° C. of about 1,000 cP to about 10,000 cP, for example, about 4,000 cP to about 9,000 cP.

The adhesive film may be produced by any suitable method available in the art. For example, the adhesive film may be produced by coating the adhesive composition onto a release film, followed by curing. Curing may be performed by irradiation at a wavelength of about 300 nm to about 400 nm at a UV dose of about 400 mJ/cm$^2$ to about 3,000 mJ/cm$^2$ under oxygen-free conditions using a low-pressure lamp.

An optical member according to an embodiment of the present disclosure includes an optical film, and an adhesive film formed on at least one surface of the optical film, wherein the adhesive film includes the adhesive film according to embodiments of the present disclosure. Accordingly, the optical member exhibits good bending properties and/or good folding properties, and thus can be used in a flexible display.

Examples of the optical film may include a polarizing plate, a color filter, a retardation film, an elliptical polarizing film, a reflective film, an anti-reflection film, a compensation film, a brightness improving film, an alignment film, a light diffusion film, a glass shatterproof film, a surface protective film, a plastic LCD substrate, a transparent electrode film such as an indium tin oxide (ITO)-containing film, and/or the like. The optical film can be easily produced by a person having ordinary skill in the art.

For example, a touch panel may be attached to a window film or an optical film via the adhesive film, thereby forming a touch pad. In some embodiments, the adhesive film may be applied to any suitable polarizing film available in the art.

An optical display according to an embodiment of the present disclosure includes the adhesive film according to embodiments of the present disclosure. The optical display may include an organic light emitting diode (OLED) display, a liquid crystal display, and/or the like. The optical display may include a flexible display. In some embodiments, the optical display may include a non-flexible display.

Figure 3:
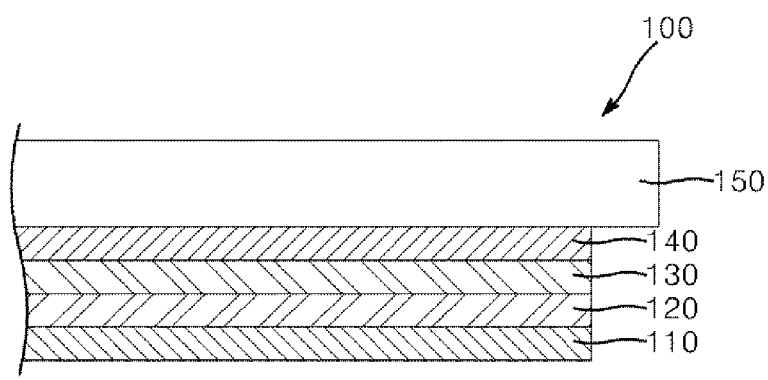
FIG. 3 is a cross-sectional view of an optical display according to an embodiment of the present disclosure.

Next, a flexible display according to an embodiment of the present disclosure will be described with reference to FIG. 3. FIG. 3 is a sectional view of a flexible display according to an embodiment of the present disclosure.

Referring to FIG. 3, a flexible display 100 according to an embodiment includes a display unit 110, an adhesive layer 120, a polarizing plate 130, a touchscreen panel 140, and a flexible window film 150, wherein the adhesive layer 120 may include the adhesive film according to embodiments of the present disclosure.

The display unit 110 serves to drive the flexible display 100, and may include a substrate and an optical device including an OLED, an LED, a quantum dot light emitting diode (QLED), or an LCD element formed on the substrate. The display unit 110 may include a lower substrate, a thin film transistor, an organic light emitting diode, a planarization layer, a protective layer, and an insulation layer.

The polarizing plate 130 can realize polarization of internal light or prevent or reduce reflection of external light to realize a display, or can increase contrast of the display. The polarizing plate 130 may be composed of a polarizer alone. In some embodiments, the polarizing plate 130 may include a polarizer and a protective film formed on one or both surfaces of the polarizer. In some embodiments, the polarizing plate 130 may include a polarizer and a protective coating layer formed on one or both surfaces of the polarizer. As the polarizer, the protective film and the protective coating layer, any suitable polarizer, any suitable protective film and any suitable protective coating layer available in the art may be used.

The touchscreen panel 140 generates electrical signals through detection of variation in capacitance when a human body or a conductor such as a stylus touches the touchscreen panel 140, and the display unit 110 may be driven by such electrical signals. The touchscreen panel 140 is formed by patterning a flexible conductive conductor, and may include first sensor electrodes and second sensor electrodes each formed between the first sensor electrodes and intersecting the first sensor electrodes. The touchscreen panel 140 may include a conductive material such as metal nanowires, conductive polymers, and carbon nanotubes, without the touchscreen panel being limited thereto.

The flexible window film 150 is formed as an outermost layer of the flexible display 100 to protect the flexible display.

Adhesive layers may be further formed between the polarizing plate 130 and the touchscreen panel 140 and/or between the touchscreen panel 140 and the flexible window film 150 to reinforce bonding between the polarizing plate, the touchscreen panel, and/or the flexible window film. In an embodiment, the adhesive layers may be formed of an adhesive composition that includes a (meth)acrylic resin, a curing agent, an initiator, and/or a silane coupling agent. In another embodiment, the adhesive layers may include the adhesive films according to embodiments of the present disclosure. In addition, a polarizing plate may be further disposed under the display unit 110, thereby realizing polarization of internal light.

Hereinafter, embodiments of the present disclosure will be described in more detail with reference to some examples. It should be understood that these examples are provided for illustration only and are not to be construed in any way as limiting the present disclosure.

EXAMPLE

Preparative Example

Organic nanoparticles were prepared by emulsion polymerization. The core was formed of poly(butyl acrylate) and the shell was formed of poly(methyl methacrylate). In the organic nanoparticles, the shell was present in an amount of 35 wt % and the core was present in an amount of 65 wt %, based on the total weight of the organic nanoparticles, and the organic nanoparticles had an average particle diameter of 100 nm and a refractive index of 1.48.

Example 1

100 parts by weight of a mixture including 76.5 parts by weight of 2-ethylhexyl acrylate (2-EHA), 22.5 parts by weight of 4-hydroxybutyl acrylate (4-HBA) and 1 part by weight of the organic nanoparticles prepared in Preparative Example, and 0.03 parts by weight of an initiator, Irgacure 651 (2,2-dimethoxy-2-phenylacetophenone, BASF), were sufficiently mixed in a reactor. After substituting dissolved oxygen in the reactor with nitrogen gas, the mixture was subjected to partial polymerization through irradiation with UV light for several minutes using a low pressure mercury lamp, thereby preparing a viscous liquid having a viscosity of 5,000 cP at 25° C. 0.5 parts by weight of an initiator, Irgacure 184 (1-hydroxycyclohexylphenylketone, available from BASF), was added to the viscous liquid and mixed therewith, thereby preparing an adhesive composition. The adhesive composition was coated onto a polyethylene terephthalate (PET) release film and irradiated with UV light at a UV dose of 2,000 mJ/cm$^2$, thereby producing an adhesive sheet in which a 50 μm thick adhesive film is formed on the PET film.

Examples 2 and 3

Adhesive sheets were produced in the same manner as described with respect to Example 1 except that the amounts of 2-ethylhexyl acrylate and 4-hydroxybutyl acrylate were changed as listed in Table 1.

Example 4

100 parts by weight of a mixture including 79 parts by weight of 2-ethylhexyl acrylate, 20 parts by weight of 4-hydroxybutyl acrylate, and 1 part by weight of a macromonomer AA-6 (available from Toagosei Co., Ltd.), and 0.03 parts by weight of an initiator, Irgacure 651 (2,2-dimethoxy-2-phenylacetophenone, available from BASF), were sufficiently mixed in a reactor. After substituting dissolved oxygen in the reactor with nitrogen gas, the mixture was subjected to partial polymerization through irradiation with UV light for several minutes using a low pressure mercury lamp, thereby preparing a viscous liquid having a viscosity of 4,000 cP to 9,000 cP at 25° C. 0.5 parts by weight of an initiator, Irgacure 184 (1-hydroxycyclohexylphenylketone, available from BASF), was added to the viscous liquid and mixed therewith, thereby preparing an adhesive composition. An adhesive sheet was produced using the adhesive composition in the same manner as described with respect to Example 1.

Example 5

An adhesive sheet was produced in the same manner as described with respect to Examples 1 and 4 except that the amounts of 2-ethylhexyl acrylate, 4-hydroxybutyl acrylate, the organic nanoparticles of Preparative Example and the macromonomer were changed as in Table 1.

Comparative Example 1

100 parts by weight of a mixture including 85 parts by weight of 2-ethylhexyl acrylate and 15 parts by weight of 4-hydroxybutyl acrylate, and 0.03 parts by weight of an initiator, Irgacure 651 (2,2-dimethoxy-2-phenylacetophenone, available from BASF), were sufficiently mixed in a reactor. After substituting dissolved oxygen in the reactor with nitrogen gas, the mixture was subjected to partial polymerization through irradiation with UV light for several minutes using a low pressure mercury lamp, thereby preparing a viscous liquid having a viscosity of 4,000 cP to 9,000 cP at 25° C. 0.5 parts by weight of an initiator, Irgacure 184 (1-hydroxycyclohexylphenylketone, BASF), was added to the viscous liquid and mixed therewith, thereby preparing an adhesive composition. An adhesive sheet was produced using the adhesive composition in the same manner as described with respect to Example 1.

Comparative Example 2

An adhesive sheet was produced in the same manner as described with respect to Example 1 except that the amounts of 2-ethylhexyl acrylate and 4-hydroxybutyl acrylate were changed as listed in Table 1.

The adhesive sheets prepared in the Examples and Comparative Examples were evaluated as to the properties as listed in Table 1. Results are shown in Table 1.

(1) Haze: A haze meter (Model NDH 5000, available from Nippon Denshoku Co., Ltd.) was used. Haze was measured on a 50 μm thick adhesive film in accordance with ASTM D 1003-95 5 "Standard Test for Haze and Luminous Transmittance of Transparent Plastic".

Figure 4A:
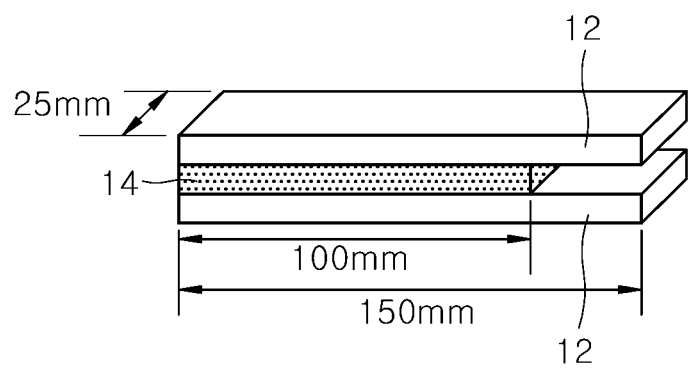
FIGS. 4A-4B are conceptual diagrams of a specimen for measuring peel strength.
Figure 4B:
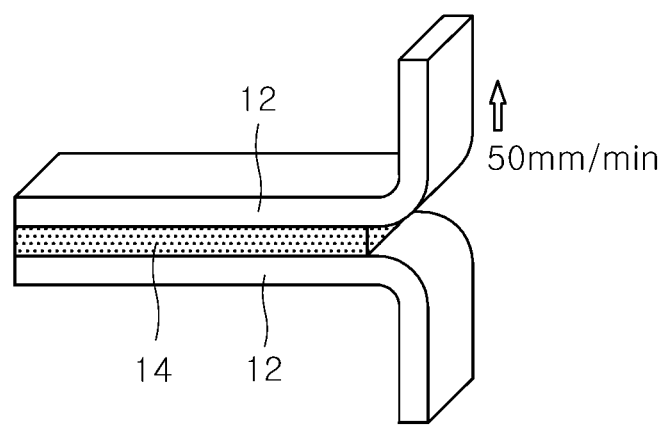

(2) Peel strength: A PET film 12 (FIGS. 4A-4B) having a size of 150 mm×25 mm×75 μm (length×width×thickness) was subjected to corona treatment twice (total dose: 156) under plasma discharge at a dose of 78 using a corona treatment device. An adhesive film sample 14 (FIGS. 4A-4B) having a size of 100 mm×25 mm×100 μm (length×width×thickness) was obtained from each of the adhesive sheets prepared in the Examples and Comparative Examples. The corona-treated surfaces of the PET films 12 were laminated on both surfaces of the adhesive film sample 14, respectively, thereby preparing a specimen, as shown in FIG. 4A. The specimen was autoclaved under conditions of 3.5 bar and 50° C. for 1,000 seconds and secured to a TA.XT_Plus texture analyzer (available from Stable Micro Systems Ltd.). Referring to FIG. 4B, with the PET film at one side fixed to the TA.XT_Plus Texture Analyzer at 25° C., T-peel strength was measured by pulling the other side of the PET film at a speed of 50 mm/min.

(3) Folding evaluation parameter 1: An adhesive film was obtained by removing the release films from each of the adhesive sheets of the Examples and Comparative Examples. Folding evaluation parameter 1 was evaluated at 25° C. using a TA.XT_Plus Texture Analyzer (available from Stable Micro Systems Ltd.).

Referring to FIGS. 1A-1B, two polyethylene terephthalate (PET) films 2 (thickness: 75 μm) having a size of 50 mm×20 mm were attached to each other via an adhesive film 4 having a size of 20 mm×20 mm×50 μm such that two respective ends of the PET films 2 were attached to each other by the adhesive film in the order of PET film/adhesive film/PET film, thereby providing a specimen having a contact area of 20 mm×20 mm between the adhesive film and each of the PET films (adhesive film attached portion 8). Jigs were fastened to two respective ends of the PET films of the specimen (jig secured portions 6). A contact area between each of the jigs and the respective PET film 2 was adjusted to 15 mm×20 mm. The folding evaluation parameter 1 was evaluated at 25° C. Then, with one of the jigs secured, the other jig was pulled together with the PET film at a speed of 300 mm/min until the adhesive film had a length (unit: μm, $X_3$) of 1,000% of an initial thickness (unit: μm, $X_0$) thereof, that is, 10 times the initial thickness of the adhesive film, and was maintained for 10 seconds. Then, the adhesive film was restored at the same or substantially the same speed (e.g., 300 mm/min) as the pulling speed, followed by releasing the pulling force applied to the adhesive film. Referring to FIG. 2, a graph in which the stretched length of the adhesive film is indicated on the X-axis and force applied to the adhesive film is indicated on the Y-axis was obtained. Assuming that the stretched length of the adhesive film upon application of a force of 90 kPa is defined as $X_1$ (unit: μm), the folding evaluation parameter 1 is a value calculated by Equation 1.

(4) Folding evaluation parameter 2: A specimen was prepared in the same manner as described with respect to the evaluation of the folding evaluation parameter 1. The folding evaluation parameter 2 was evaluated at 60° C. A graph was obtained by operating the jigs in the same manner as described with respect to the evaluation of the folding evaluation parameter 1. Assuming that the stretched length in μm of the adhesive film upon application of a force of 0 kPa after stretching the adhesive film to the length $X_3$ in μm of 1,000% of the initial thickness $X_0$ thereof, maintaining the adhesive film at the length $X_3$ for 10 seconds, and restoring the adhesive film to the unloaded state at the speed of 300 mm/min is defined as $X_2$ (unit: μm), the folding evaluation parameter 2 is a value calculated by the following Equation 2.

(5) Foldability evaluation: A 50 μm thick adhesive film was obtained by removing the release films from each of the adhesive sheets of the Examples and Comparative Examples. Two adhesive films were stacked to realize a 100 μm thick adhesive film. Polyethylene terephthalate films were stacked on the adhesive film in order of PET film (thickness: 100 μm)/adhesive film (thickness: 100 μm)/PET film (thickness: 100 μm) and cut into a size of 25 mm×130 mm, thereby preparing a specimen. With a rod for dynamic bending testing (radius: 3 mm, flexural resistance meter, SDI) placed at the center of the specimen in the transverse direction, operation of folding the specimen about the rod and unfolding the specimen back was repeated in order to measure a minimum number of cycles (1 cycle refers to an operation of folding the adhesive film in half once and unfolding the adhesive film back), at which there was no cracking in the PET films or no striped patterns at a folded portion of the specimen and the adhesive film did not suffer from fracture, slight lifting, delamination, and the like. An adhesive film having a large minimum number of cycles means an adhesive film capable of easily relieving stress applied to the polyethylene terephthalate films caused by bending. An adhesive film having a minimum number of cycles of 100,000 or more was rated as ○, an adhesive film having a minimum number of cycles of 70,000 or more was rated as Δ, and an adhesive film having a minimum number of cycles of less than 70,000 was rated as X.

TABLE 1

|  | Example 1 | Example 2 | Example 3 | Example 4 | Example 5 | Comparative Example 1 | Comparative Example 2 |
| --- | --- | --- | --- | --- | --- | --- | --- |
| 2-EHA (parts by weight) | 76.5 | 79 | 81.5 | 79 | 78 | 85 | 65 |
| 4-HBA (parts by weight) | 22.5 | 20 | 17.5 | 20 | 20 | 15 | 35 |
| Organic nanoparticles (parts by weight) | 1 | 1 | 1 | — | 1 | — | — |
| Macromonomer (parts by weight) | — | — | — | 1 | 1 | — | — |
| Haze (%) | 0.59 | 0.63 | 0.61 | 0.60 | 0.58 | 0.59 | 0.60 |

TABLE 1-continued

|  | Example 1 | Example 2 | Example 3 | Example 4 | Example 5 | Comparative Example 1 | Comparative Example 2 |
|---|---|---|---|---|---|---|---|
| Peel strength (gf/in) | 1,350 | 1,270 | 1,230 | 1,410 | 1,470 | 1,340 | 980 |
| Folding evaluation parameter 1 (%) | 1,070 | 1,133 | 1,204 | 1,107 | 1,094 | 1,354 | 873 |
| Folding evaluation parameter 2(%) | 83 | 77 | 72 | 78 | 80 | 35 | 85 |
| Foldability evaluation | ○ | ○ | ○ | ○ | ○ | X | X |

As shown in Table 1, the adhesive films of the Examples had low haze, transparency, and good peel strength to be used as adhesive films, and satisfied requirements for the folding evaluation parameters 1 and 2 according to embodiments of the present disclosure to exhibit good foldability in folding evaluation. As such, embodiments of the present disclosure provide an adhesive film having good foldability. Embodiments of the present disclosure provide an adhesive film having good foldability in a wide temperature range. Embodiments of the present disclosure provide an adhesive film having good peel strength and good transparency.

Embodiments of the present disclosure provide an optical member including the adhesive film and an optical display including the adhesive film.

Conversely, the adhesive films of Comparative Examples 1 and 2 failed to satisfy at least one requirement for the folding evaluation parameters 1 and 2 according to embodiments of the present disclosure and thus did not exhibit good foldability in folding evaluation.

It should be understood that various modifications, changes, and alterations can be made by those skilled in the art without departing from the spirit and scope of the invention as defined by the appended claims, and equivalents thereof.

What is claimed is:

1. An adhesive film comprising:
an adhesive composition comprising a hydroxyl group-containing (meth)acrylic copolymer, organic nanoparticles, and an initiator, the adhesive film having a folding evaluation parameter 1 of about 900% to about 1,300% at 25° C., as calculated by Equation 1 and a folding evaluation parameter 2 of about 40% to about 95% at 60° C., as calculated by Equation 2, Folding evaluation parameter $1=(X_1)/(X_0)\times 100$      Equation 1

Folding evaluation parameter $2=(1-(X_2)/(X_3))\times 100$      Equation 2 wherein, in Equation 1, $X_1$ is a stretched length in μm of the adhesive film upon application of 90 kPa to the adhesive film during pulling the adhesive film at a speed of 300 mm/min to a length $X_3$ in of 1,000% of $X_0$, an initial thickness thereof in μm, wherein, in Equation 2, $X_2$ is a stretched length in μm of the adhesive film after stretching the adhesive film to the length $X_3$ in μm of 1,000% of the initial thickness $X_0$ thereof, maintaining the adhesive film at the length $X_3$ for 10 seconds, and restoring the adhesive film to the unloaded state at the speed of 300 mm/min, and wherein $X_1$, $X_2$, and $X_3$ are obtained using a specimen prepared by attaching two polyethylene terephthalate (PET) films to each other via the adhesive film such that two respective ends of the PET films are attached to each other by the adhesive film in the order of a first end of one PET film/the adhesive film/a second end of the other PET film such that the specimen has a contact area of 20 mm×20 mm between the adhesive film and each of the PET films, two jigs are fastened to the respective ends of the PET films, and, with one of the jigs secured, the other jig is pulled at the speed of 300 mm/min until the adhesive film has the length $X_3$ of 1,000% of the initial thickness X0, and the length $X_3$ is maintained for 10 seconds.

2. The adhesive film according to claim 1, wherein the adhesive film also has a haze of about 1% or less at a wavelength of about 380 nm to about 780 nm.

3. The adhesive film according to claim 1, wherein the hydroxyl group-containing (meth)acrylic copolymer is a copolymer of a hydroxyl group-containing (meth)acrylate, a reactive or non-reactive (meth)acrylate, and a macromonomer.

4. The adhesive film according to claim 1, wherein the organic nanoparticles have an average particle diameter of about 10 nm to about 400 nm.

5. The adhesive film according to claim 1, wherein the organic nanoparticles are core-shell particles.

6. The adhesive film according to claim 5, wherein the core and the shell satisfy Equation 3:

$Tg(c)<Tg(s)$,      Equation 3 wherein Tg(c) is a glass transition temperature of the core and Tg(s) is a glass transition temperature of the shell.

7. The adhesive film according to claim 1, wherein the organic nanoparticles are present in an amount of 0.1 wt % to 20 wt % in the adhesive film, based on the total weight of the adhesive film.

8. The adhesive film according to claim 5, wherein the core is formed of at least one selected from poly(butyl acrylate) and a polysiloxane, and the shell is formed of poly(methyl methacrylate).

9. The adhesive film according to claim 3, wherein the hydroxyl group-containing (meth)acrylic copolymer is a copolymer of a monomer mixture comprising about 4 wt % to about 40 wt % of the hydroxyl group-containing (meth)acrylate, about 55 wt % to about 95 wt % of the reactive or non-reactive (meth)acrylate, and about 0.1 wt % to about 20 wt % of the macromonomer, based on the total weight of the monomer mixture.

10. The adhesive film according to claim 3, wherein the hydroxyl group-containing (meth)acrylic copolymer is a copolymer of a monomer mixture comprising about 5 wt % to about 45 wt % of the hydroxyl group-containing (meth)acrylate and about 55 wt % to about 95 wt % of the reactive or non-reactive (meth)acrylate, based on the total weight of the monomer mixture.

11. The adhesive film according to claim 3, wherein the reactive or non-reactive (meth)acrylate is a (meth)acrylic monomer.

12. The adhesive film according to claim 11, wherein the (meth)acrylic monomer is an alkyl (meth)acrylate.

13. The adhesive film according to claim 1, wherein the adhesive composition further comprises at least one selected from a silane coupling agent and a crosslinking agent.

14. An optical member comprising an optical film and the adhesive film according to claim 1 on at least one surface of the optical film.

15. An optical display comprising the adhesive film according to claim 1.

* * * * *